US012266496B2

(12) United States Patent
Muniyappan et al.

(10) Patent No.: US 12,266,496 B2
(45) Date of Patent: Apr. 1, 2025

(54) HYDRAULIC SIMULTANEOUS MULTI-POLE CONTACT OPENING MECHANISM FOR CIRCUIT INTERRUPTERS

(71) Applicant: EATON INTELLIGENT POWER LIMITED, Dublin (IE)

(72) Inventors: Jayaraman Muniyappan, Pernambut (IN); Santhosh Kumar Chamarajanagar Govinda Nayaka, Moon Township, PA (US); Robert Michael Slepian, Murrysville, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 159 days.

(21) Appl. No.: 18/140,855

(22) Filed: Apr. 28, 2023

(65) Prior Publication Data

US 2024/0363301 A1 Oct. 31, 2024

(51) Int. Cl.

| | |
|---|---|
| ***H01H 3/24*** | (2006.01) |
| ***H01H 50/36*** | (2006.01) |
| ***H01H 50/44*** | (2006.01) |
| ***H01H 50/54*** | (2006.01) |
| ***H01H 89/00*** | (2006.01) |

(52) U.S. Cl.

CPC .............. *H01H 89/00* (2013.01); *H01H 3/24* (2013.01); *H01H 50/36* (2013.01); *H01H 50/44* (2013.01); *H01H 50/54* (2013.01)

(58) Field of Classification Search

CPC ................................ H01H 3/24; H01H 89/00

USPC .......................................................... 335/186

See application file for complete search history.

(56) References Cited

U.S. PATENT DOCUMENTS

| | | | | |
|---|---|---|---|---|
| 3,745,280 A * | 7/1973 | Pratsch | H01H 33/34 218/83 |
| 6,649,853 B2 * | 11/2003 | Takagi | H01H 33/34 218/78 |
| 11,626,263 B2 * | 4/2023 | Zhou | H01H 50/443 218/154 |

* cited by examiner

*Primary Examiner* — Alexander Talpalatski

(74) *Attorney, Agent, or Firm* — Eckert Seamans Cherin & Mellott, LLC

(57) ABSTRACT

A hydraulic multi-pole actuation system opens all poles of a circuit interrupter simultaneously. The system utilizes Thomson coil arrangements with a wide piston attached to the conductive member of each arrangement. A narrow piston is attached to the movable conductor of each pole assembly in the circuit interrupter. The wide and narrow pistons are contained within a hydraulic tank. Activating the Thomson coils causes the wide pistons to displace the hydraulic fluid, and the displaced fluid pushes against the narrow pistons to cause the movable conductors to open the line connections in their respective pole assemblies. The wide pistons have a greater collective surface area that interfaces with the hydraulic fluid than the narrow pistons do, enabling fewer Thomson coils arrangements to be used than there are poles in the circuit interrupter, and enabling movement of the wide pistons to be amplified during translation into movement of the narrow pistons.

20 Claims, 6 Drawing Sheets

HYDRAULIC SIMULTANEOUS MULTI-POLE CONTACT OPENING MECHANISM FOR CIRCUIT INTERRUPTERS

FIELD OF THE INVENTION

The disclosed concept relates generally to circuit interrupters, and in particular, to high speed actuation mechanisms used to open and close separable contacts in circuit interrupters.

BACKGROUND OF THE INVENTION

Circuit interrupters, such as for example and without limitation, those used in circuit breakers, are typically used to protect electrical circuitry from damage due to an overcurrent condition, such as an overload condition, a short circuit, or another fault condition, such as an arc fault or a ground fault. Circuit interrupters typically include mechanically separable electrical contacts, which operate as a switch. When the separable contacts are in contact with one another in a closed state, current is able to flow through any circuits connected to the circuit interrupter. When the separable contacts are isolated from one another in an open state, current is prevented from flowing through any circuits connected to the circuit interrupter. The separable contacts may be operated either manually by way of an operator handle or automatically in response to a detected fault condition. Typically, such circuit interrupters include an actuator designed to rapidly close or open the separable contacts, and a trip mechanism, such as a trip unit, which senses a number of fault conditions to trip the separable contacts open automatically using the actuator. Upon sensing a fault condition, the trip unit trips the actuator to move the separable contacts to their open position.

Hybrid circuit interrupters employ a power electronic interrupter in addition to the mechanical separable contacts. The power electronic interrupter is connected in parallel with the mechanical contacts, and comprises electronics structured to commutate current after a fault is detected. Once current is commutated from the mechanical switch to the power electronic interrupter, the mechanical separable contacts are able to separate with a reduced risk of arcing. It is advantageous to commutate as much current as possible to the electronic branch as quickly as possible and to open the mechanical separable contacts at high speeds in order to limit the let-through current during a fault condition.

Mechanical separable contacts typically comprise one stationary contact disposed at the end of a stationary electrode stem, and one movable contact disposed at the end of a movable electrode stem, with the electrode stem being a component of a larger movable conductor assembly. The force required to open mechanical separable contacts quickly can be significant due to the mass of the movable conductor assembly that must be driven open in order to separate the separable contacts during a fault condition. Thomson coil actuators are noted for their ability to open mechanical separable contacts at very high speeds, and are often employed in hybrid circuit interrupters. However, because the lapse of any time between the occurrence of a fault condition and the opening of the mechanical separable contacts leads to at least some current passing through the mechanical separable contacts, there is always a need for actuators that can open mechanical separable contacts at higher speeds than available actuators can.

There is thus room for improvement in mechanisms used to open separable contacts in circuit interrupters.

SUMMARY OF THE INVENTION

These needs, and others, are met by a hydraulic multi-pole actuation system structured to open all poles of a circuit interrupter simultaneously. The system utilizes Thomson coil arrangements with a wide piston attached to the conductive member of each Thomson coil arrangement. A narrow piston is attached to the movable conductor of each pole assembly in the circuit interrupter. The wide and narrow pistons are contained within a hydraulic tank. Activating the coil in each Thomson coil arrangement repels the conductive member away from the coil, causing the wide pistons to displace the hydraulic fluid, and the displaced fluid pushes against the narrow pistons to move the movable conductors away from the stationary conductors, thus opening the line connections in the pole assemblies. The wide pistons have a greater collective surface area that interfaces with the hydraulic fluid than the narrow pistons do, enabling fewer Thomson coils arrangements to be used than there are poles in the circuit interrupter, and enabling movement of the wide pistons to be amplified during translation into movement of the narrow pistons.

In accordance with one aspect of the disclosed concept, a multi-pole actuation system for use with a multi-pole circuit interrupter comprises: a hydraulic tank containing hydraulic fluid; a plurality of narrow pistons corresponding in number to the plurality of poles; and a number of Thomson coil arrangements, the number of Thomson coil arrangements being fewer in number than the plurality of poles. Each narrow piston includes: a narrow piston crown that interfaces with the hydraulic fluid, and a narrow piston connecting rod extending proximally from the narrow piston crown to an exterior of the hydraulic tank and structured to be connected to a movable conductor of one pole of the circuit interrupter. Each Thomson coil arrangement includes: a conductive coil configured to be actuated by a current source, a conductive member positioned adjacent the conductive coil, and a wide piston. Each wide piston includes: a wide piston crown that interfaces with the hydraulic fluid, and a wide piston connecting rod extending proximally from the wide piston crown and fixedly coupled to its corresponding conductive member.

A collective total surface area of all surfaces of the number of wide pistons that interface with the hydraulic fluid is greater than a collective total surface area of all surfaces of the narrow pistons that interface with the hydraulic fluid. The hydraulic tank is structured such that, when every conductive member is adjacent its corresponding conductive coil and every conductive coil is activated with current: each conductive coil repels its corresponding conductive member in a proximal direction, and movement of any conductive member in the proximal direction causes the hydraulic fluid to exert force against the plurality of narrow pistons in a distal direction.

In accordance with another aspect of the disclosed concept, a circuit interrupter comprises: an electronic trip unit, a plurality of pole assemblies, and a multi-pole actuation system. Each pole assembly is structured to be connected between one phase of power from a power source and a load, and each pole assembly comprises: a stationary conductor with a stationary separable contact, a movable conductor with a movable separable contact, and a current sensor in communication with the trip unit and structured to sense current flowing from the power source to the load through the pole assembly. The movable conductor is structured to move between a closed state in which the movable separable contact is electrically connected to the stationary separable contact and an open state in which the movable separable contact is electrically isolated from the stationary separable contact. The multi-pole actuation system is structured to move the movable conductor of every pole assembly between the closed state and the open state, and comprises: a hydraulic tank containing hydraulic fluid; a plurality of narrow pistons corresponding in number to the plurality of pole assemblies; and a number of Thomson coil arrangements, the number of Thomson coil arrangements being fewer in number than the plurality of pole assemblies. Each narrow piston includes: a narrow piston crown that interfaces with the hydraulic fluid, and a narrow piston connecting rod extending proximally from the narrow piston crown to an exterior of the hydraulic tank and connected to the movable conductor of one pole assembly. Each Thomson coil arrangement includes: a conductive coil configured to be actuated by a current source, a conductive member positioned adjacent the conductive coil when all movable conductors are in the closed state, and a wide piston. Each wide piston includes: a wide piston crown that interfaces with the hydraulic fluid, and a wide piston connecting rod extending proximally from the wide piston crown and fixedly coupled to the corresponding conductive member. A collective total surface area of all surfaces of the number of wide pistons that interface with the hydraulic fluid is greater than a collective total surface area of all surfaces of the narrow pistons that interface with the hydraulic fluid. The hydraulic tank is structured such that, when all movable conductors are in the closed state and every conductive coil is activated with current: each conductive coil repels its corresponding conductive member in a proximal direction, and movement of any conductive member in the proximal direction causes the hydraulic fluid to exert force against the plurality of narrow pistons in a distal direction and move all of the movable conductors to the open state.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
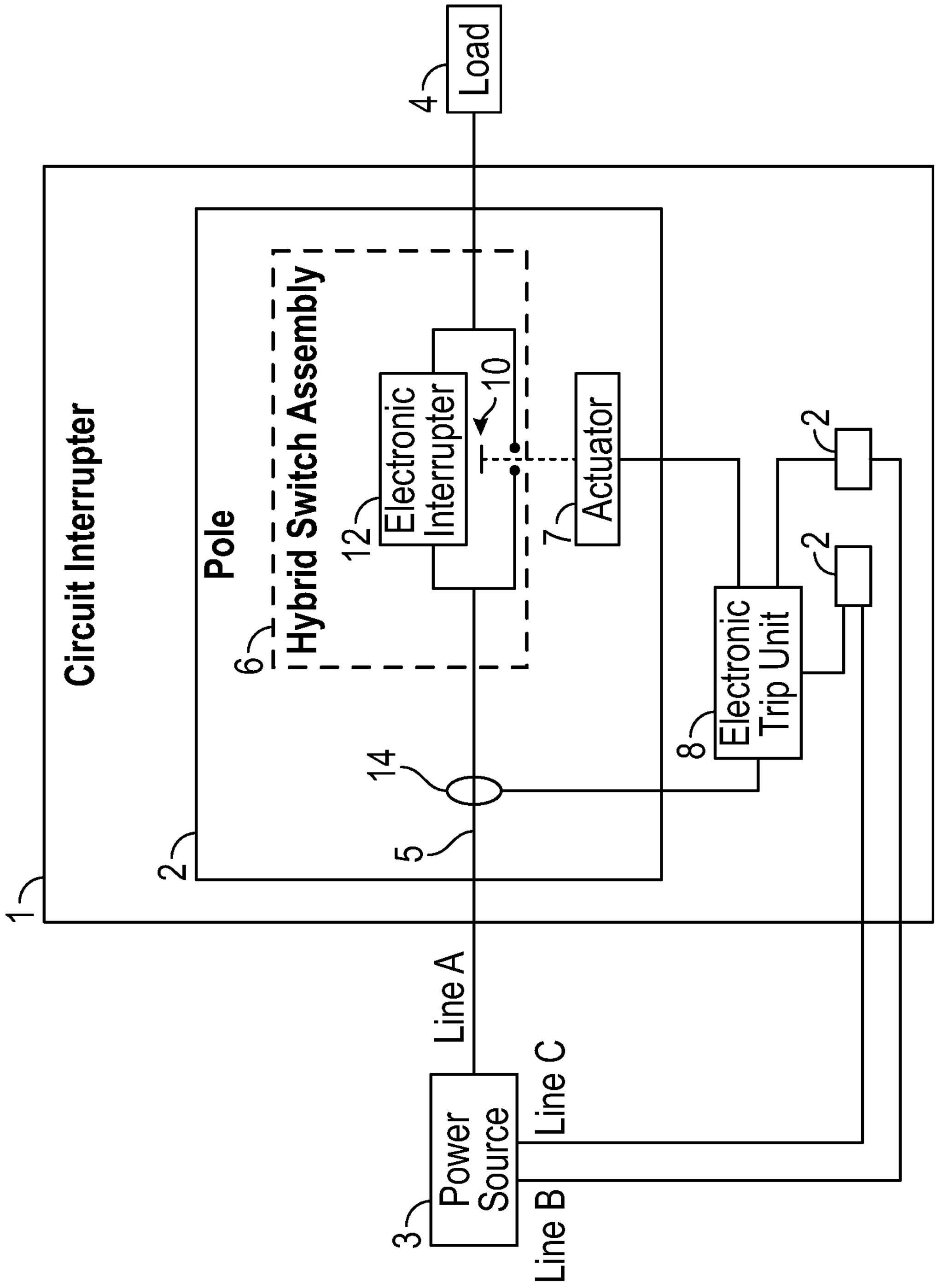
FIG. 1 is a schematic diagram of a multi-pole hybrid circuit interrupter in which each given pole includes an actuator that can only open the separable contacts within the given pole.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a hybrid circuit interrupter 1 (e.g., without limitation, a circuit breaker) that includes a plurality of pole assemblies 2, with each pole assembly 2 being connected to a single phase of power. For ease of illustration, only one pole assembly 2 is shown in detail in FIG. 1 (i.e. the pole assembly connected to line A), however, it should be noted that the two other pole assemblies shown in FIG. 1 (i.e. those connected to line B and line C) are understood to include all of the same components as the pole assembly 2 connected to line A and to function in the same manner as the pole assembly 2 connected to line A. A description of the function of the components of the pole assembly 2 connected to line A follows, and is understood to apply to the other two pole assemblies as well.

The pole assembly 2 is structured to be electrically connected between a power source 3 and a load 4 via a line conductor 5. The circuit interrupter 1 is structured to trip open or switch open to interrupt current flowing between the power source 3 and load 4 in the event of a fault condition (e.g., without limitation, an overcurrent condition) to protect the load 4, circuitry associated with the load 4, as well as the power source 3. The pole assembly 2 includes a hybrid switch assembly 6 and an actuator 7, and the circuit interrupter 1 includes an electronic trip unit 8. The hybrid switch assembly 6 in FIG. 1 is a simplified depiction of a hybrid switch intended to demonstrate how current commutates past mechanical separable contacts in a hybrid switch, and is not intended to be limiting on the different types of hybrid switch assemblies that can be included in a hybrid circuit interrupter 1.

The hybrid switch assembly 6 comprises a set of mechanical separable contacts 10 and a power electronic interrupter 12. The trip unit 8 is structured to monitor power flowing through the pole assembly 2 via a current sensor 14 and/or other sensors and to detect fault conditions based on the power flowing through the pole assembly 2. In response to detecting a fault condition, the trip unit 8 is structured to output a signal to the actuator 7, which is structured to open the mechanical separable contacts 10 in order to interrupt current flowing through the pole assembly 2 in response to receiving the signal from the trip unit 8. The opening of mechanical separable contacts is referred to hereinafter as an “opening operation”.

Under normal operating conditions, the mechanical contacts 10 are in a closed state such that they are in contact with one another, enabling current to flow from the power source 3 through the line conductor 5 and the mechanical contacts 10 to the load 4. In addition, the power electronic interrupter 12 is powered off under normal operating conditions, such that current cannot flow through the power electronic interrupter 12. In response to detecting a fault condition, the trip unit 8 is configured to output a first signal to the power electronic interrupter 12 that causes the power electronic interrupter 12 to be powered on, and to output a second signal to the actuator 7 that causes the actuator 7 to open the mechanical contacts 10. The transmission of the second signal from the trip unit 8 to the actuator 7 to open the mechanical contacts 10 commutates the current, i.e. forces the current to pass through the power electronic interrupter 12, as current will not flow through the power electronic interrupter 12 until the mechanical contacts 10 start to separate. The faster the mechanical contacts 10 separate, the lower the fault current flow through the power electronic interrupter 12 will be. The power electronic interrupter 12 is powered off shortly after commutation in order to fully interrupt the flow of current.

As previously noted, all three pole assemblies shown in FIG. 1 include all of the same components, and each pole 2 is connected to a single phase of power. Accordingly, it should be understood that the trip unit 8 receives sensor data from each phase’s current sensor 14 and monitors each phase for fault conditions. When the trip unit 8 detects a fault in any phase, the trip unit 8 initiates commutation and interruption of current in all of the pole assemblies 2 of the circuit interrupter 1. That is, the trip unit 8 causes the power electronic interrupters 12 of all phases’ pole assemblies 2 to be powered on and causes the actuator 7 of all phases’ pole assemblies 2 to open their corresponding separable contacts 12 in order commutate current to the electronic interrupters 12 of all pole assemblies 2, and then causes the electronic interrupters 12 of all pole assemblies 2 to be powered off in order to fully interrupt the flow of current in the entire circuit interrupter 1. It is noted that the actuator 7 of each phase’s pole assembly 2 operates independently of every other pole assembly’s actuator 7 in the circuit interrupter 1.

Figure 2A:
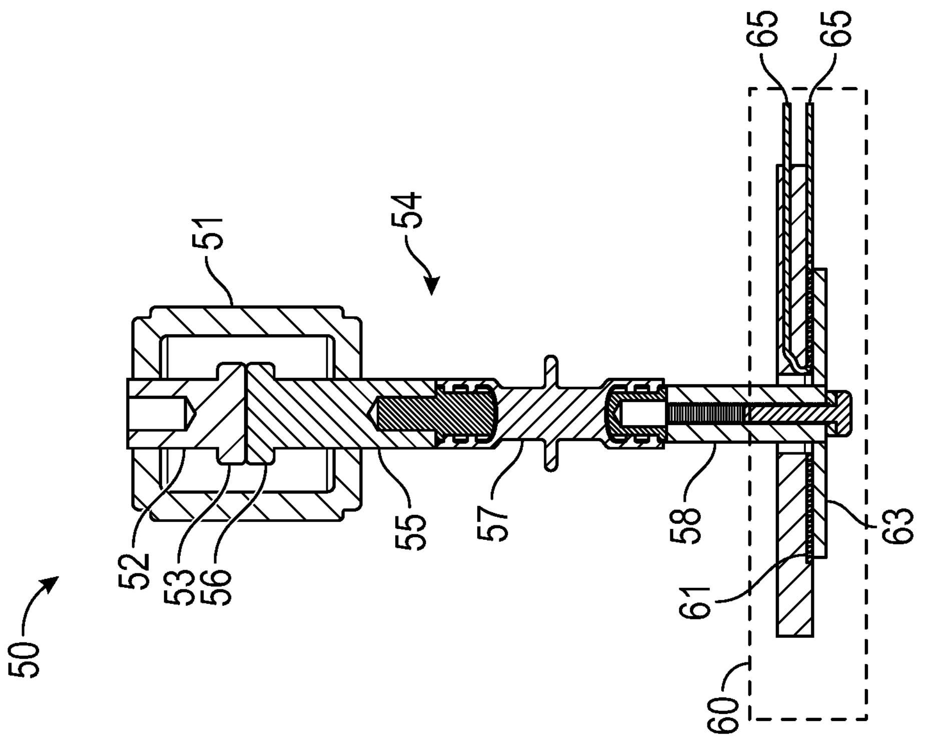
FIG. 2A (Prior Art)
FIG. 2A is a partial sectional side view of a pole assembly that uses a prior art single pole Thomson coil actuator and that can be used in a circuit interrupter such as the hybrid circuit interrupter depicted in FIG. 1, showing the separable contacts of the pole assembly in a closed state.
Figure 2B:
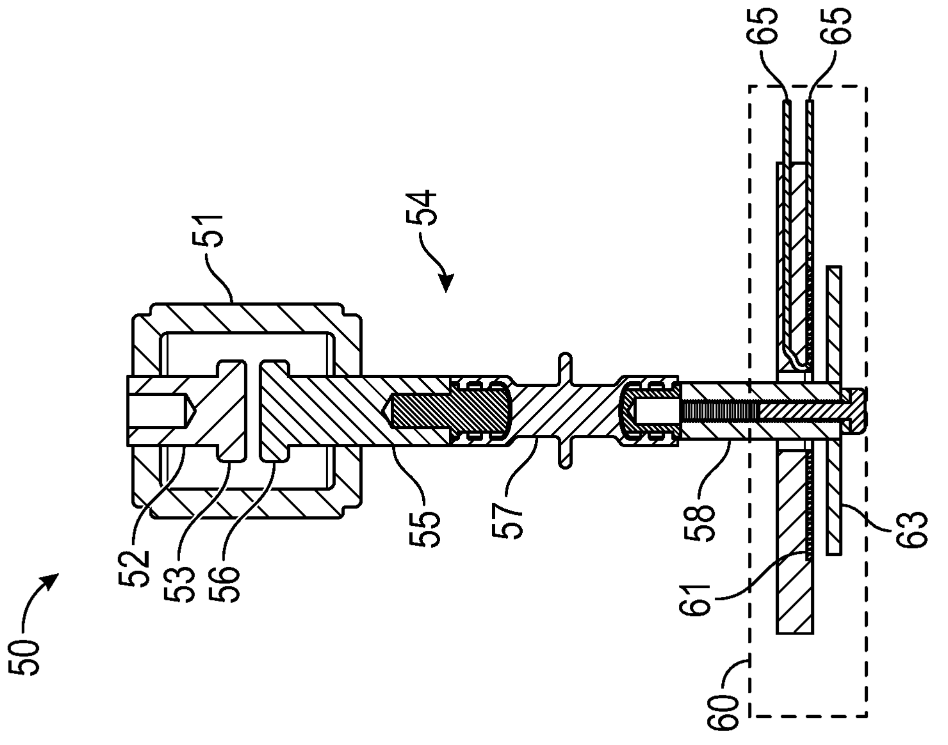
FIG. 2B (Prior Art)
FIG. 2B shows the pole assembly shown in FIG. 2A, showing the separable contacts of the pole assembly in an open state.

FIGS. 2A and 2B depict a portion of a pole assembly 50 that can be used in a single pole of a circuit interrupter, such as the schematically depicted circuit interrupter 1 shown in FIG. 1. The pole assembly 50 is an embodiment of the pole assemblies 2 of the circuit interrupter 1 shown in FIG. 1, such that three instances of the pole assembly 50 can be used in place of the three pole assemblies 2 shown in FIG. 1. The pole assembly 50 uses a prior art Thomson coil actuator 60 to drive a pair of separable contacts open from a closed state during a fault condition. The Thomson coil actuator 60 of the pole assembly 50 can be used as the actuator 7 shown in FIG. 1. FIG. 2A shows the separable contacts of the pole assembly 50 in a closed state, and FIG. 2B shows the separable contacts of the pole assembly 50 in an open state after being driven open by the Thomson coil actuator 60.

In addition to the Thomson coil actuator 60, the pole assembly 50 includes a vacuum housing 51, a fixed electrode stem 52 that comprises a fixed separable contact 53, and a moving assembly 54 that includes a moving electrode stem 55 comprising a movable separable contact 56, an isolation coupling 57, an actuator shaft 58, and the moving components of the Thomson coil actuator 60 (said moving components being detailed herein below), all coupled to one another as shown. The fixed electrode stem 52 is fixed relative to both the vacuum housing 51 and an external electrical conductor (i.e. the line conductor 5 shown in FIG. 1), which is electrically interconnected with the power source 3 (FIG. 1) supplying power to the circuit interrupter 1. The Thomson coil actuator 60 comprises a planar Thomson coil 61 housed in a housing 62 that is fixed in position, and a conductive plate 63 that is coupled via the actuator shaft 58 to the isolation coupling 57.

The Thomson coil 61 is configured to be connected to a current source (not shown) via coil leads 65. Under normal operating conditions in the circuit interrupter 1, the Thomson coil 61 is not activated and the separable contacts 53 and 56 are closed, as shown in FIG. 2A. When the trip unit 8 detects a fault condition, the trip unit 8 actuates the current source to provide current to the Thomson coil 61 in order to generate a magnetic field that repulses the conductive plate 63 away from the Thomson coil 61, thus driving the entire movable assembly 54 away from the fixed electrode stem 52 and separating the movable separable contact 56 from the fixed separable contact 53, as shown in FIG. 2B. It is noted that the Thomson coil assemblies 60 of all three pole assemblies 50 are simultaneously actuated by the trip unit 8 when a fault condition is detected in any one of the three phases shown in FIG. 1, and that each phase’s Thomson coil assembly 60 operates independently of the other two phases’ Thomson coil assemblies 60.

Figure 3:
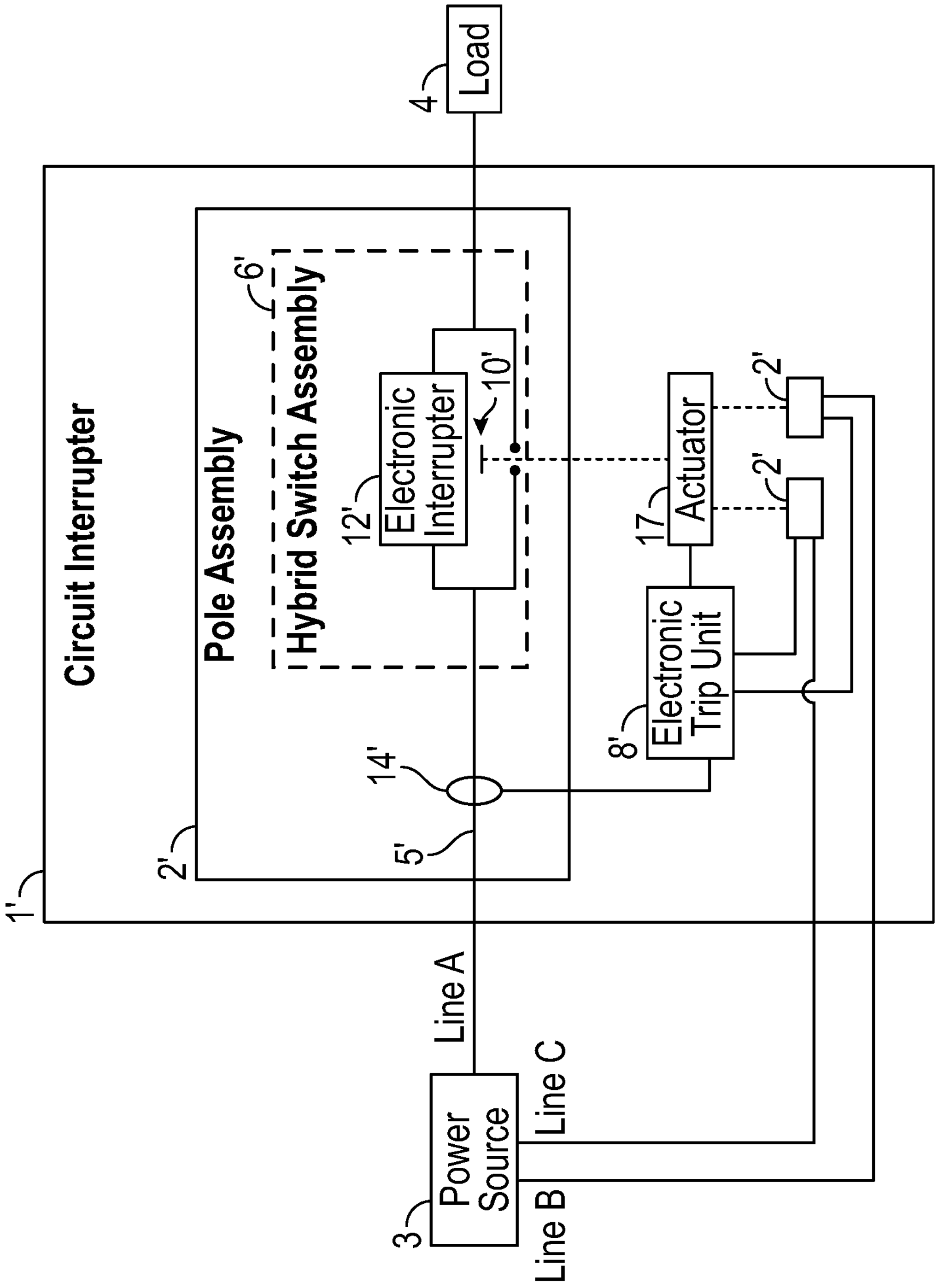
FIG. 3 is a schematic diagram of a multi-pole hybrid circuit interrupter in which a single actuator is used to simultaneously open the separable contacts of all poles, in accordance with an example embodiment of the disclosed concept.
Figure 4A:
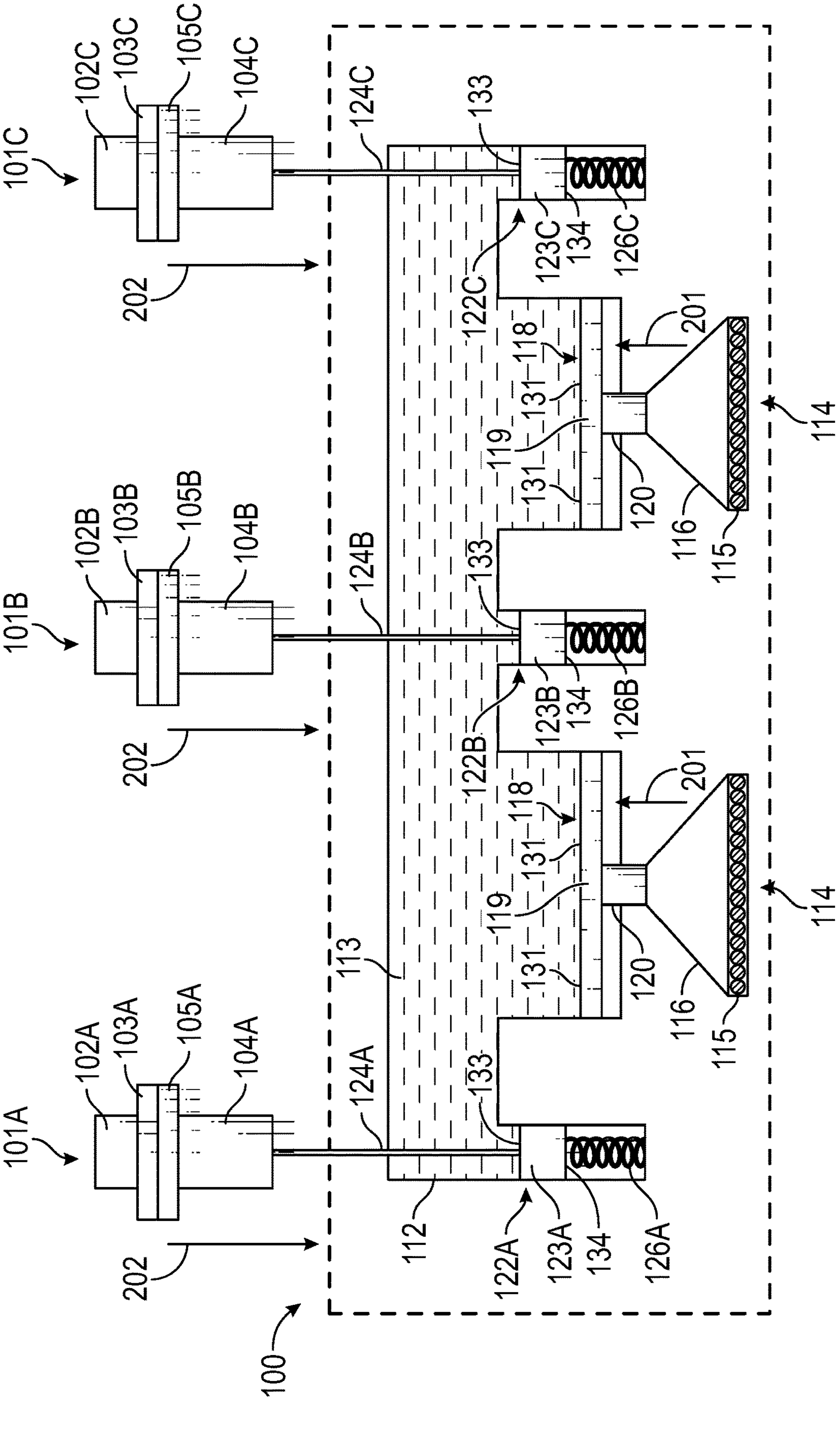
FIG. 4A is a partial sectional side view of multiple pole assemblies whose separable contacts are in a closed state and a hydraulic multi-pole actuation system that can be used in a circuit interrupter such as the hybrid circuit interrupter depicted in FIG. 3, in accordance with an example embodiment of the disclosed concept.
Figure 4B:
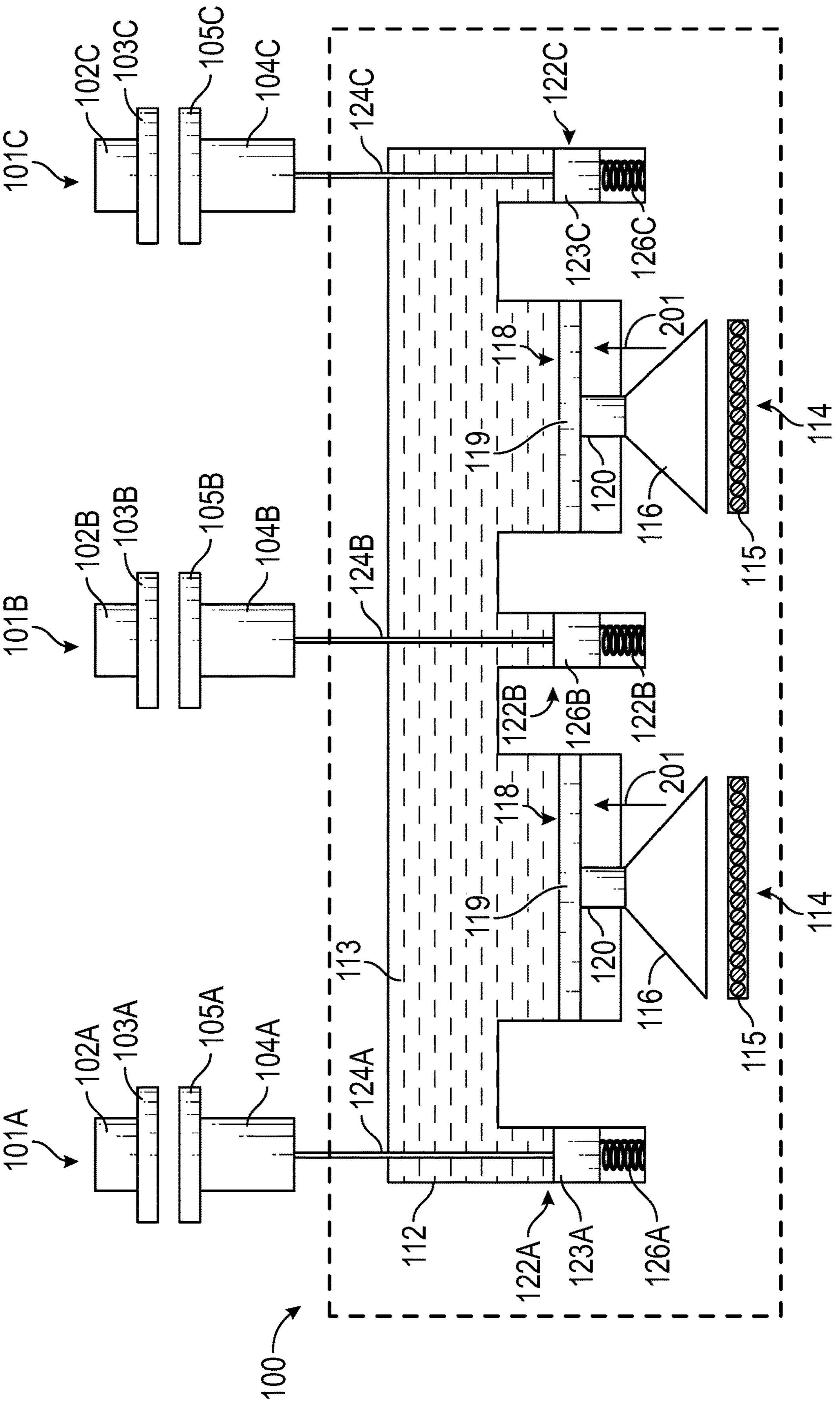
FIG. 4B is a side view of the pole assemblies and hydraulic multi-pole actuation system shown in FIG. 4A, with the separable contacts of the pole assemblies in an open state, in accordance with an example embodiment of the disclosed concept.

Reference is now made to FIG. 3 and FIGS. 4A and 4B. FIG. 3 is a schematic diagram of a multi-pole hybrid circuit interrupter 1' in which a single actuator is structured to open the separable contacts of all poles simultaneously, in accordance with an example embodiment of the disclosed concept. FIGS. 4A and 4B depict a multi-pole actuation system 100 that can be used with the circuit interrupter 1' of FIG. 3, in accordance with an example embodiment of the disclosed concept.

The circuit interrupter 1' shown in FIG. 3 includes almost all of the same components of the circuit interrupter 1 shown in FIG. 1, except that the circuit interrupter 1' includes a single actuator 17 instead of including an actuator 7 in each pole assembly as the circuit interrupter 1 does. The actuator 17 of the circuit interrupter 1' is common to all of the pole assemblies 2' in the circuit interrupter 1' and simultaneously actuates all of the separable contacts 10' of all pole assemblies 2' within the circuit interrupter 1', in contrast with the circuit interrupter 1 wherein each given pole assembly 2 includes its own individual actuator 7 that only actuates the separable contacts 10 within that given pole assembly 2 and is operated independently of every other pole assembly’s actuator 7. Aside from the actuator 17, the components of the circuit interrupter 1' correspond to and are functionally equivalent to the components included in the circuit interrupter 1. Accordingly, every component of the circuit interrupter 1' (FIG. 3) that is structurally and functionally equivalent to a corresponding component of the circuit interrupter 1 (FIG. 1) is numbered with the same reference number used for the corresponding component of circuit interrupter 1, with the addition of a prime symbol (i.e. ').

Thus, when the electronic trip unit 8' of the circuit interrupter 1' detects a fault in any phase, the trip unit 8' first causes the power electronic interrupters 12' of all phases' pole assemblies 2' to be powered on, then causes the single actuator 17' to open the separable contacts 10' of all pole assemblies 2' simultaneously in order to commutate the current in each phase to that phase's power electronic interrupter 12', and lastly causes all of the phases' power electronic interrupters 12' to be powered off in order to fully interrupt all current within the circuit interrupter 1'. The actuation system 100 shown in FIGS. 4A and 4B is shown in conjunction with three pole assemblies 101A, 101B, and 101C. It is noted that the multi-pole actuation system 100 is an embodiment of the actuator 17 shown in FIG. 3 such that the actuation system 100 can be used in the circuit interrupter 1' in place of the actuator 17. It is further noted that the pole assemblies 101 are embodiments of the pole assemblies 2' shown in FIG. 3 such that the pole assemblies 101 can be used in place of the pole assemblies 2' shown in FIG. 3.

While three identical pole assemblies 101A, 101B, and 101C are depicted in FIGS. 4A and 4B, it will become apparent in the following detailed description that the actuation system 100 can be adapted to simultaneously open the separable contacts of more than three poles or only two poles without departing from the scope of the disclosed concept. The pole assemblies 101A, 101B, and 101C shown in FIGS. 4A and 4B may be referred to collectively as the "pole assemblies 101" and any pole assembly may be referred to individually as a "pole assembly 101". Similarly, several similar components are included in all three pole assemblies 101, as described hereinafter, and these components are labeled with reference numbers that include one of the letters "A", "B", or "C" and may be referred to collectively or individually without the aforementioned letters.

Each pole assembly 101 includes a stationary conductor 102 comprising a stationary contact 103 and a movable conductor 104 comprising a movable contact 105. FIG. 4A shows the pole assemblies 101 in the closed state, i.e. when the movable conductors 104 are in the closed position such that each movable contact 105 is in physical and electrical contact with the stationary contact 103. FIG. 4B shows the pole assemblies 101 in an open state, i.e. after the movable conductors 104 have physically separated from the stationary conductors 102 such that the movable contacts 105 are electrically isolated from the stationary contacts 103.

The multi-pole actuation system 100 comprises a hydraulic tank 112 filled with hydraulic fluid 113, a number of Thomson coil arrangements 114 each comprising a Thomson coil 115 and a conductive member 116 connected to a wide piston 118 that includes a crown 119 and a connecting rod 120, a plurality of narrow pistons 122 each including a crown 123 and a connecting rod 124, and a number of reset springs 126. The multi-pole actuation system 100 includes fewer Thomson coil arrangements 114 than there are pole assemblies 101. It is noted that, although FIGS. 4A and 4B depict the multi-pole actuation system 100 having only one fewer Thomson coil arrangement 114 than there are pole assemblies 101, i.e. two Thomson coil arrangements 114 and three pole assemblies 101, the multi-pole actuation system 100 can be adapted to include even fewer Thomson coil arrangements 114 relative to the number of pole assemblies 101 (for example and without limitation, only one Thomson coil arrangement 114 for three pole assemblies 101) without departing from the scope of the disclosed concept.

Each wide piston 118 is fixedly coupled to its corresponding conductive member 116 via the wide piston connecting rod 120. The plurality of narrow pistons 122 correspond in number to the plurality of pole assemblies 101 such that each narrow piston 122 corresponds to and is coupled to one of the movable conductors 104 via the narrow piston connecting rod 124. Accordingly, the multi-pole actuation system 100 includes fewer wide pistons 118 and Thomson coil arrangements 114 than narrow pistons 122 and pole assemblies 101. The wide pistons 118 are referred to as "wide" and the narrow pistons 122 are referred to as "narrow" due to each individual wide piston 118 having a larger surface area that interfaces with the hydraulic fluid 113 than any individual narrow piston 122 does. Furthermore, the collective total surface area of all wide pistons 118 that interfaces with the hydraulic fluid 113 in the multi-pole actuation system 100 is greater than the collective total surface area of all narrow pistons 122 that interface with the hydraulic fluid 113.

The pole assemblies 101 can be described as comprising both a proximal end and a distal end, with the stationary conductor 102 being positioned at the proximal end, and the narrow pistons 122 being positioned at the distal end (the distal end being disposed opposite the proximal end). In addition, with respect to any given component of a pole assembly 101 or with respect to any given component of the multi-pole actuation system 100, the term "proximal" is used hereinafter to refer to an end of the component that is disposed closest to the stationary conductor 102, and the term "distal" is used hereinafter to refer to an end of the component that is disposed furthest away from the stationary conductor 102. That is, the distal end of a given component is disposed opposite the proximal end of the given component. For example, the proximal surface 131 (numbered only in FIG. 4A) of each wide piston crown 119 is the surface of the wide piston crown 119 that interfaces with the hydraulic fluid 113, while the distal surface 132 (numbered only in FIG. 5) of each wide piston crown 119 is the surface that faces the corresponding Thomson coil 115 and interfaces with the exterior of the hydraulic tank 112. Similarly, the proximal surface 133 (numbered only in FIG. 4A) of each narrow piston crown 123 is the surface of the narrow piston crown 123 that interfaces with the hydraulic fluid 113, while the distal surface 134 (numbered only in FIG. 4A) of each narrow piston crown 123 engages the corresponding reset spring 126.

In addition, the term "proximally" can be used to denote a direction indicating movement toward the stationary conductor 102, and the term "distally" can be used to denote a direction indicating movement away from the stationary conductor 102. Proximal movement is denoted by the arrows 201 in FIG. 4A, and distal movement is denoted by the arrows 202 in FIG. 4A. Because the proximal and distal directions/orientations are parallel to the longitudinal axis of each pole assembly 101, the proximal and distal directions/orientations can also be referred to as "axial" directions/orientations. In contrast, all directions and orientations disposed orthogonally to the axial directions/orientations can be referred to as "lateral" directions/orientations. For example, each Thomson coil arrangement 114 shown in FIGS. 4A and 4B is positioned laterally between two pole assemblies 101.

Each Thomson coil 115 is fixed in position and is configured to be connected to and activated by a current source (not shown in the figures). Referring to FIG. 4A, when the separable contacts 103, 105 are closed, the conductive member 116 is positioned adjacent the conductive coil. When the separable contacts 103, 105 need to be opened, current is supplied to each Thomson coil 115 to generate a magnetic field that repulses the corresponding conductive member 116 away from the Thomson coil 115, thus pushing the conductive member 116 and its attached wide piston 118 in the proximal direction 201 (i.e. in the upward direction, relative to the view shown in FIG. 4A, the arrows indicating the proximal direction 201 only being numbered in FIG. 4A) against the hydraulic fluid 113. The proximal force exerted by the wide pistons 118 against the hydraulic fluid 113 displaces the hydraulic fluid 113, causing the hydraulic fluid 113 to exert a force in the distal direction 202 (i.e. in the downward direction, relative to the view shown in FIG. 4A, the arrows indicating the distal direction 202 only being numbered in FIG. 4A) against the proximal surfaces 133 of the narrow pistons 122. The distal force exerted by the hydraulic fluid 113 against the narrow pistons 122 causes the movable conductors 104 to move in the distal direction 202 and thus to physically separate from the stationary conductors 102.

It is noted that the reset springs 126 are structured to bias the movable conductors 104 to the closed state (i.e. such that the movable contacts 105 are in physical and electrical contact with the stationary contacts 103) when no compressive force is acting upon the reset springs 126. Accordingly, when the separable contacts 103, 105 are open and need to be re-closed, deactivating the Thomson coils 115 removes the distal force exerted by the hydraulic fluid 113 on the narrow pistons 122, enabling the reset springs 126 to expand and push the narrow pistons 122 and movable conductors 104 in the proximal direction 201 back to the closed state. It will be appreciated that the movement of the narrow pistons 122 in the proximal direction displaces the hydraulic fluid 113 and causes the hydraulic fluid 113 to push against the wide pistons 118 in the distal direction 202 until the conductive members 116 are adjacent to the Thomson coils 115.

Figure 5:
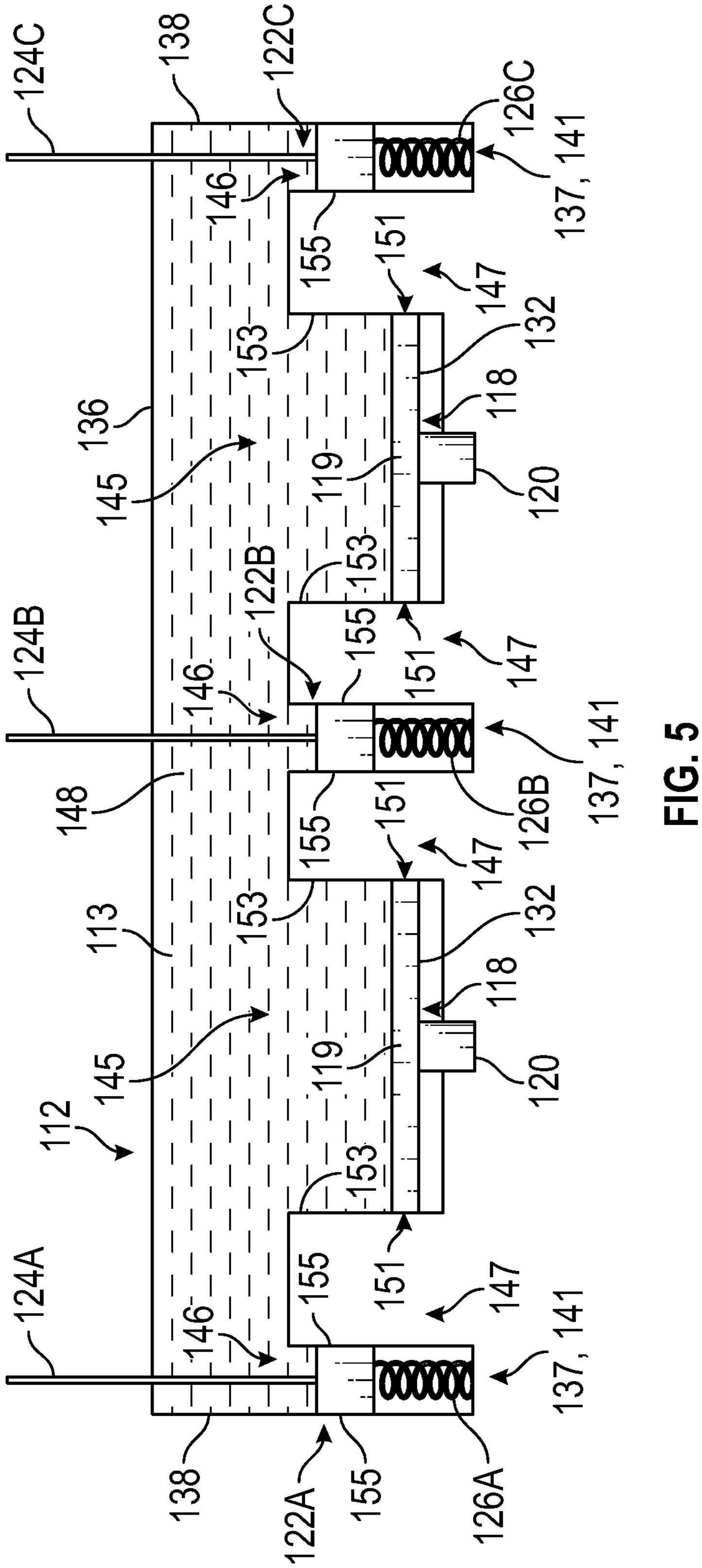
FIG. 5 is a side view of a hydraulic tank and other select components of the hydraulic multi-pole actuation system shown in FIGS. 4A and 4B.

For ease of illustration and in order to better highlight features of the hydraulic tank 112, FIG. 5 shows the hydraulic tank 112 and other select components of the multi-pole actuation system 100 while omitting other portions of the multi-pole actuation system 100 and the pole assemblies 101. The hydraulic tank 112 has a proximal wall 136 that faces the stationary conductors 102 and a plurality of distal wall structures 137 disposed opposite the proximal wall 136. The hydraulic tank 112 also has two lateral walls 138, with a first of the lateral walls 138 extending between the proximal wall 136 and a first of the distal wall structures 137 so as to connect the proximal wall 136 with the first distal wall structure 137, and a second of the lateral walls 138 extending between the proximal wall 136 and a second of the distal wall structures 137 so as to connect the proximal wall 136 with the second distal wall structure 137. Those distal wall structures 137 that are connected to a lateral wall 138 are additionally identified as laterally disposed distal wall structures 141.

As shown in FIG. 5, there is one distal wall structure 137 that is not a laterally disposed distal wall structure 141 and that is instead disposed between the two laterally disposed distal wall structures 141. This distal wall structure 137 is additionally identified as a medially disposed distal wall structure 143. It is noted that circuit interrupters typically include a housing that houses all of the components, and that the medially disposed distal wall structure 143 can be fixedly coupled to the housing of the circuit interrupter 1' in order to maintain the medially disposed distal wall structure 143 in a fixed position. It will be appreciated that an embodiment of the multi-pole actuation system 100 structured for use with a circuit interrupter having more than three poles can include more than one medially disposed distal wall structure 143, and that another embodiment of the multi-pole actuation system 100 structured for use with a circuit interrupter having only two poles can omit the medially disposed distal wall structure 143.

Still referring to FIG. 5, the proximal wall 136 is generally planar in a plane orthogonal to the viewing plane of FIGS. 4A and 4B, while the distal wall structures 137 form a plurality of wide channels 145 and narrow channels 146, with each wide channel 145 or narrow channel 146 being separated from the next-closest narrow channel 146 or wide channel 145 by a rut 147. The interior of the hydraulic tank 112 has a proximal chamber 148 that is adjacent to the proximal wall 136 and extends laterally between the lateral walls 138. The proximal chamber 148 is in fluid communication with both the wide channels 145 and the narrow channels 146, and the narrow channels 146 are in fluid communication with the wide channels 145 via the proximal chamber 148. The connecting rods 124 of the narrow pistons 122 extend proximally from the narrow piston crowns 123 through the proximal chamber 148 and through the proximal wall 136 to the exterior of the hydraulic tank 112. The wide channels 145 and narrow channels 146 extend distally from the proximal chamber 148. Each reset spring 126 is positioned to extend between the distal end of its corresponding narrow channel 146 and the distal side of the corresponding narrow piston crown 123.

It is noted that the wide channels 145 receive the wide pistons 118 and are structured to be wide enough to enable the wide pistons 118 to move axially during an opening operation and narrow enough to prevent the hydraulic fluid 113 from leaking out of the hydraulic tank 112. Similarly, the narrow channels 146 receive the narrow pistons 122 and are structured to be wide enough to enable the narrow pistons 122 to move axially during an opening operation and narrow enough to prevent the hydraulic fluid 113 from leaking distally around the lateral sides 155 of the narrow piston crown heads 123 toward the reset springs 126. In an example embodiment of the hydraulic tank 112, O-rings are inserted between the lateral edges 151 of the wide piston crowns 119 and the lateral walls 153 of the wide channels 145 in order to enable the conductive members 116 to move freely in the axial directions and to form a fluid-tight seal that prevents the hydraulic fluid 113 from leaking out through the distal ends of the wide channels 145. Similarly, in the same example embodiment of the hydraulic tank 112, O-rings are inserted between the lateral edges 155 of the narrow piston crowns 123 and the lateral walls (not numbered in the figures) of the narrow channels 146 in order to enable the narrow pistons 122 to move freely in the axial directions and to form a fluid-tight seal that prevents the hydraulic fluid 113 from leaking around the lateral edges 155 of the narrow piston crowns 123 toward the reset springs 126.

The disclosed multi-pole actuation system 100 provides several advantages over prior art systems that use a single-pole actuator for each individual pole assembly within a circuit interrupter. Because the multi-pole actuation system 100 requires fewer Thomson coil arrangements 114 than there are pole assemblies 101, the multi-pole actuation system 100 uses less space than those actuation arrangements that require a one-to-one ratio of Thomson coil actuators 60 to pole assemblies 50. The lesser use of space by the multi-pole actuation system 100 also arises from the Thomson coil arrangements 114 of the multi-pole actuation system 100 being disposed laterally relative to the pole assemblies 101, rather than axially.

Another advantage of the disclosed multi-pole actuation system 100 is that the multi-pole actuation system 100 uses less total force to move the pole assemblies 101 during an opening operation (as compared to a prior art system that requires a one-to-one ratio of Thomson coil actuators 60 to pole assemblies 50), due to the relatively large ratio of the surface area of the wide piston crown proximal surfaces 131 to the surface area of the narrow piston crown proximal surfaces 133. It will be appreciated that, during an opening operation, the aforementioned surface area ratio results in the movement of the wide pistons 118 in the proximal direction 201 being amplified during translation into movement of the narrow pistons 122 and movable contacts 105 in the distal direction 202. For example and without limitation, if the total collective surface area of the wide piston crown proximal surfaces 131 is three times greater than the total collective surface area of the narrow piston crown proximal surfaces 133, and the Thomson coil arrangements 114 are configured to move the conductive members 116 and wide pistons 118 a distance of 0.33 millimeters (mm) in the proximal direction 201 within the first 0.25 milliseconds (ms) of an opening operation, then the narrow pistons 122 will move approximately 1.0 mm in 0.25 ms (i.e. three times the distance traveled by the wide pistons 118), and thus achieve an initial opening gap of 1.0 mm between the separable contacts 103, 105 within the first 0.25 ms of an opening operation.

It will be further appreciated that the greater the ratio is of the collective total surface area of the wide piston crown proximal surfaces 131 to the collective total surface area of the narrow piston crown proximal surfaces 133, the greater the amplification will be during translation of the proximal movement of the wide pistons 118 into movement of the narrow pistons 122 in the distal direction 202. Finally, it is noted that the relatively small surface area of each narrow piston proximal surface 133 compared to the surface area of each wide piston proximal surface 131 results in: (1) the hydraulic fluid 113 exerting a lesser force against each narrow piston proximal surface 133 than each wide piston proximal surface 131 exerts against the hydraulic fluid 113, and (2) the velocity of each narrow piston 122 in the distal direction 202 (i.e. the downward direction relative to the view shown in FIGS. 4A and 4B) being greater than the velocity of the wide pistons 118 in the proximal direction 201 (i.e. the upward direction relative to the view shown in FIGS. 4A and 4B).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A multi-pole actuation system for use with a circuit interrupter, the circuit interrupter including a plurality of poles, the multi-pole actuation system comprising:
- a hydraulic tank containing hydraulic fluid;
- a plurality of narrow pistons corresponding in number to the plurality of poles, each narrow piston including:
  - a narrow piston crown that interfaces with the hydraulic fluid; and
  - a narrow piston connecting rod extending proximally from the narrow piston crown to an exterior of the hydraulic tank and structured to be connected to a movable conductor of one pole of the circuit interrupter; and
- a number of Thomson coil arrangements, the number of Thomson coil arrangements being fewer in number than the plurality of poles, each Thomson coil arrangement comprising:
  - a conductive coil configured to be actuated by a current source;
  - a conductive member positioned adjacent the conductive coil; and
  - a wide piston, each wide piston including:
    - a wide piston crown that interfaces with the hydraulic fluid; and
    - a wide piston connecting rod extending proximally from the wide piston crown and fixedly coupled to the conductive member,
- wherein a collective total surface area of all surfaces of the number of wide pistons that interface with the hydraulic fluid is greater than a collective total surface area of all surfaces of the plurality of narrow pistons that interface with the hydraulic fluid, and
- wherein the hydraulic tank is structured such that, when every conductive member is adjacent its corresponding conductive coil and every conductive coil is activated with current:
  - each conductive coil repels its corresponding conductive member in a proximal direction, and
  - movement of any conductive member in the proximal direction causes the hydraulic fluid to exert force against the plurality of narrow pistons in a distal direction.

2. The multi-pole actuation system of claim 1,
wherein the multi-pole actuation system is structured such that, when every Thomson coil arrangement is activated, the force exerted by the hydraulic fluid against the plurality of narrow pistons causes the plurality of narrow pistons to travel a distance in the distal direction that is greater than a distance traveled by the wide pistons in the proximal direction.

3. The multi-pole actuation system of claim 1,
wherein each narrow piston crown comprises a proximal surface that interfaces with the hydraulic fluid,
wherein each wide piston crown comprises a proximal surface that interfaces with the hydraulic fluid, and
wherein the proximal surface of each wide piston crown has a greater surface area than the proximal surface of each narrow piston crown.

4. The multi-pole actuation system of claim 3,
wherein each wide piston crown comprises a distal surface disposed opposite the proximal surface, and
wherein the wide piston connecting rod of each wide piston extends from the distal surface of the wide piston crown.

5. The multi-pole actuation system of claim 3, further comprising:
a plurality of reset springs corresponding in number to the plurality of narrow pistons such that each reset spring corresponds to one narrow piston,
wherein each narrow piston crown comprises a distal surface disposed opposite the proximal surface, and wherein the distal surface of each narrow piston crown engages its corresponding reset spring such that movement of each narrow piston in the distal direction compresses its corresponding reset spring.

6. The multi-pole actuation system of claim 1, wherein each wide piston is disposed laterally relative to at least one narrow pistons.

7. The multi-pole actuation system of claim 1, wherein the hydraulic tank comprises:

a proximal wall structured to face all movable conductors of the circuit interrupter;

a plurality of distal wall structures disposed opposite the proximal wall; and two lateral walls, wherein the proximal wall is generally planar, wherein a first of the two lateral walls extends between the proximal wall and a first of the distal wall structures, wherein a second of the two lateral walls extends between the proximal wall and a second of the distal wall structures, wherein the plurality of distal wall structures forms a plurality of piston channels, and wherein the plurality of piston channels is disposed between the two lateral walls.

8. The multi-pole actuation system of claim 7, wherein each piston channel is separated from a next-closest piston channel by a rut.

9. The multi-pole actuation system of claim 7, wherein the plurality of piston channels includes a plurality of narrow channels corresponding in number to the plurality of narrow pistons and a number of wide channels corresponding in number to the number of wide channels, wherein each narrow channel receives a given narrow piston from the plurality of narrow pistons and is structured to enable the given narrow piston to move axially while preventing the hydraulic fluid from leaking distally beyond the proximal surface of the given narrow piston crown within the narrow channel, and wherein each wide channel receives a given wide piston from the number of wide pistons and is structured to enable the given wide piston to move axially while preventing the hydraulic fluid from leaking distally beyond the proximal surface of the given wide piston crown to the exterior of the hydraulic tank.

10. A circuit interrupter, the circuit interrupter comprising:

an electronic trip unit;

a plurality of pole assemblies, each pole assembly being structured to be connected between one phase of power from power source and a load, each pole assembly comprising:

a stationary conductor comprising a stationary separable contact;

a movable conductor comprising a movable separable contact, the movable conductor being structured to move between a closed state in which the movable separable contact is electrically connected to the stationary separable contact and an open state in which the movable separable contact is electrically isolated from the stationary separable contact; and a current sensor in communication with the trip unit and structured to sense current flowing from the power source to the load through the pole assembly; and a multi-pole actuation system for moving the movable conductor of every pole assembly between the closed state and the open state, the multi-pole actuation system comprising:

a hydraulic tank containing hydraulic fluid;

a plurality of narrow pistons corresponding in number to the plurality of pole assemblies, each narrow piston including:

a narrow piston crown that interfaces with the hydraulic fluid; and a narrow piston connecting rod extending proximally from the narrow piston crown to an exterior of the hydraulic tank and connected to the movable conductor of one pole assembly; and a number of Thomson coil arrangements, the number of Thomson coil arrangements being fewer in number than the plurality of pole assemblies, each Thomson coil arrangement comprising:

a conductive coil configured to be actuated by a current source;

a conductive member positioned adjacent the conductive coil when all movable conductors are in the closed state; and a wide piston, each wide piston including:

a wide piston crown that interfaces with the hydraulic fluid; and a wide piston connecting rod extending proximally from the wide piston crown and fixedly coupled to the conductive member, wherein a collective total surface area of all surfaces of the number of wide pistons that interface with the hydraulic fluid is greater than a collective total surface area of all surfaces of the narrow pistons that interface with the hydraulic fluid, and wherein the hydraulic tank is structured such that, when all movable conductors are in the closed state and every conductive coil is activated with current:

each conductive coil repels its corresponding conductive member in a proximal direction, and movement of any conductive member in the proximal direction causes the hydraulic fluid to exert force against the plurality of narrow pistons in a distal direction and move all of the movable conductors to the open state.

11. The circuit interrupter of claim 10, wherein each narrow piston crown comprises a proximal surface that interfaces with the hydraulic fluid, wherein each wide piston crown comprises a proximal surface that interfaces with the hydraulic fluid, and wherein the proximal surface of each wide piston crown has a greater surface area than the proximal surface of each narrow piston crown.

12. The circuit interrupter of claim 10, wherein the trip unit is configured to cause activation of the conductive coil of every Thomson coil arrangement upon detection of a fault condition.

13. The circuit interrupter of claim 12, wherein the multi-pole actuation system is structured such that, when every movable conductor is in the closed state and the conductive coil of every Thomson coil arrangement is activated, the force exerted by the hydraulic fluid against the plurality of narrow pistons causes the plurality of narrow pistons to travel a distance in the distal direction that is greater than a distance traveled by the wide pistons in the proximal direction.

14. The circuit interrupter of claim 12,
wherein each wide piston crown comprises a distal surface disposed opposite the proximal surface, and
wherein the wide piston connecting rod of each wide piston extends from the distal surface of the wide piston crown.

15. The circuit interrupter of claim 12, wherein the multi-pole actuation system further comprises:
a plurality of reset springs corresponding in number to the plurality of narrow pistons such that each reset spring corresponds to one narrow piston,
wherein each narrow piston crown comprises a distal surface disposed opposite the proximal surface, and
wherein the distal surface of each narrow piston crown engages its corresponding reset spring such that movement of each narrow piston in the distal direction compresses its corresponding reset spring.

16. The circuit interrupter of claim 15,
wherein, when every conductive coil is deactivated:
every reset spring expands in the proximal direction and moves its corresponding narrow piston in the proximal direction,
expansion of any reset spring in the proximal direction causes the hydraulic fluid to exerts force against the number of wide pistons in the distal direction until each conductive member is adjacent its corresponding conductive coil.

17. The circuit interrupter of claim 10,
wherein each wide piston is disposed laterally relative to at least one pole assembly.

18. The circuit interrupter of claim 10,
wherein the hydraulic tank comprises:
a proximal wall structured to face all movable conductors of the circuit interrupter;
a plurality of distal wall structures disposed opposite the proximal wall; and
two lateral walls,
wherein the proximal wall is generally planar,
wherein a first of the two lateral walls extends between the proximal wall and a first of the distal wall structures,
wherein a second of the two lateral walls extends between the proximal wall and a second of the distal wall structures,
wherein the plurality of distal wall structures forms a plurality of piston channels, and
wherein the plurality of piston channels is disposed between the two lateral walls.

19. The circuit interrupter of claim 18,
wherein each piston channel is separated from a next-closest piston channel by a rut.

20. The circuit interrupter of claim 18,
wherein the plurality of piston channels includes a plurality of narrow channels corresponding in number to the plurality of narrow pistons and a number of wide channels corresponding in number to the number of wide channels,
wherein each narrow channel receives a given narrow piston from the plurality of narrow pistons and is structured to enable the given narrow piston to move axially while preventing the hydraulic fluid from leaking distally beyond the proximal surface of the given narrow piston crown within the narrow channel, and
wherein each wide channel receives a given wide piston from the number of wide pistons and is structured to enable the given wide piston to move axially while preventing the hydraulic fluid from leaking distally beyond the proximal surface of the given wide piston crown to the exterior of the hydraulic tank.

* * * * *